April 10, 1951 B. D. LEE ET AL 2,547,950
ELECTRICAL ANALOGUE
Filed May 14, 1949 2 Sheets-Sheet 1
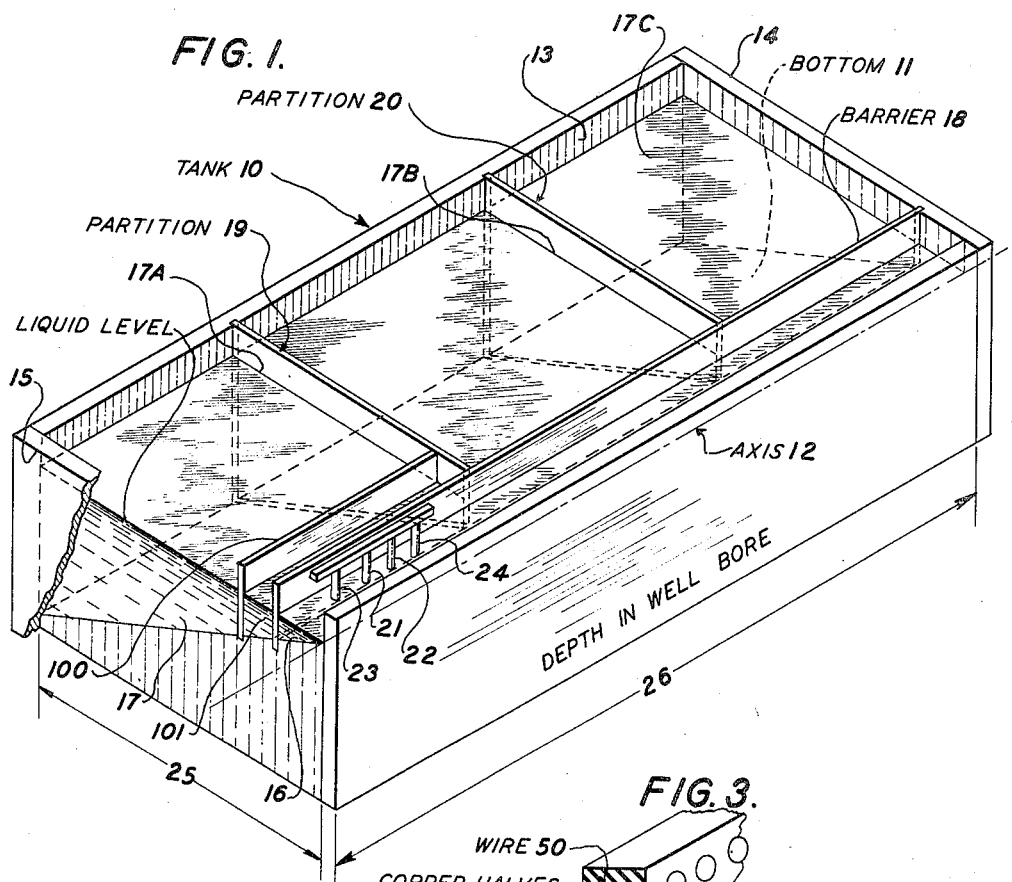
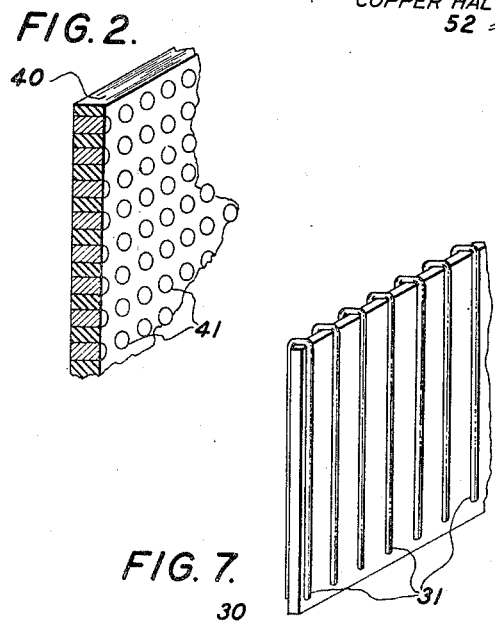
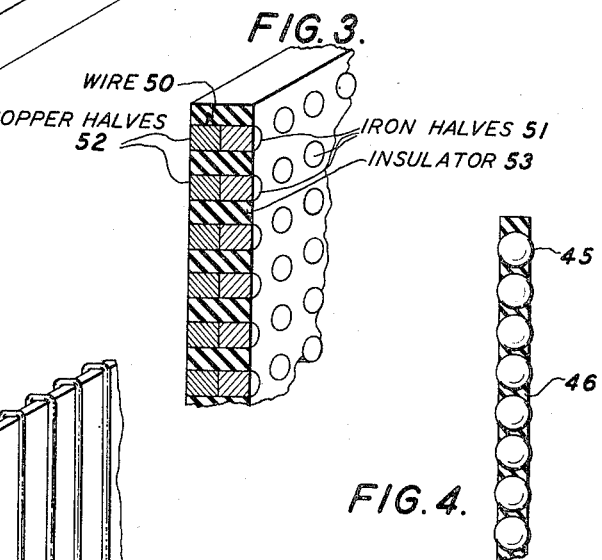
INVENTORS.
BURTON D. LEE
GERHARD HERZOG
BY Daniel Stryker
ATTORNEY

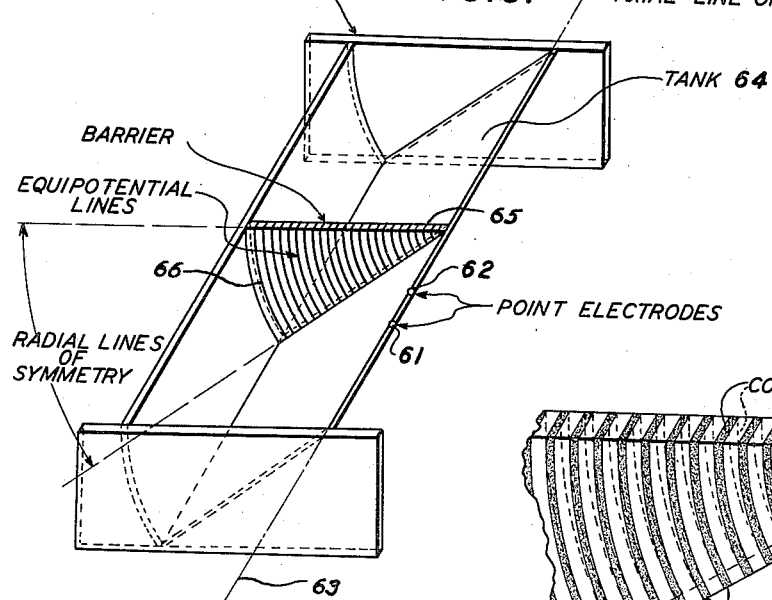
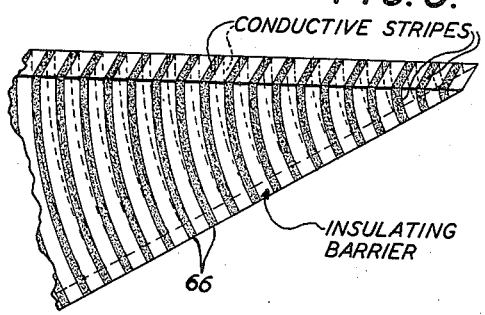
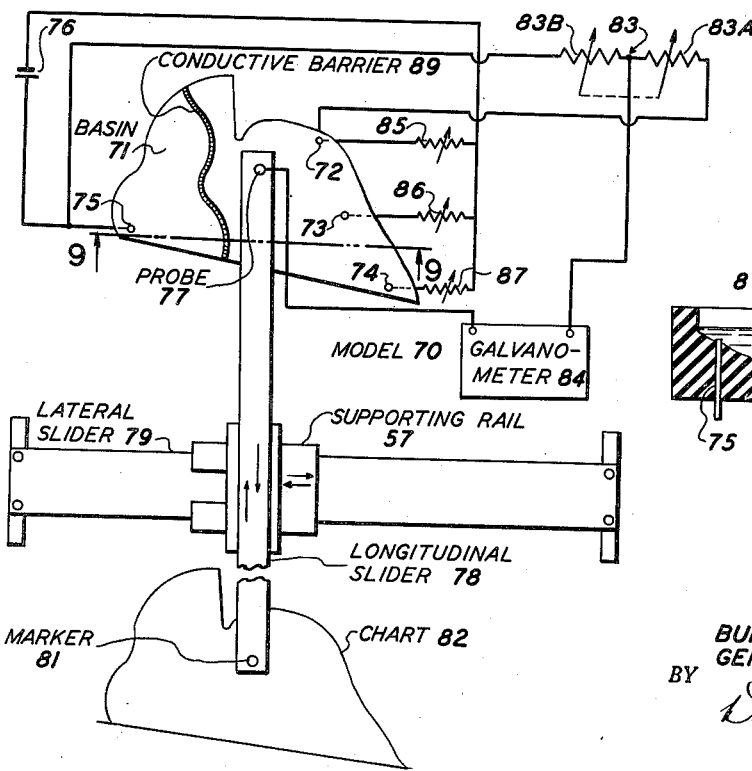
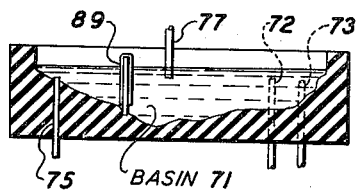

Patented Apr. 10, 1951

2,547,950

UNITED STATES PATENT OFFICE 2,547,950

ELECTRICAL ANALOGUE

Burton D. Lee and Gerhard Herzog, Houston, Tex., assignors to The Texas Company, New York, N. Y., a corporation of Delaware Application May 14, 1949, Serial No. 93,388

7 Claims. (Cl. 235—61)

This invention relates to electrical analogues employed for the solution of problems encountered in the investigation of electrical, magnetic, mechanical, hydraulic, and thermal systems, and is concerned particularly with potentiometric models of such systems. The invention provides a novel potentiometric model for investigation of the fundamentals underlying electrical well logging, and also provides novel forms of "conductive" barriers for use in a great variety of potentiometric models.

As disclosed in co-pending applications Serial No. 788,989, filed December 1, 1947, by Burton D. Lee, Serial No. 791,797, filed December 15, 1947, by Alexander Wolf, and Serial No. 674,904, filed June 6, 1946, by Wolf and Lee, a number of mechanical, magnetic, electrical and thermal systems obey Laplace's equation, at least approximately. By way of example, there is a complete analogy between the flow of an uncompressed fluid in a porous medium and the flow of electricity in a conductor. This analogy has been applied to the solution of oil and gas field problems through the construction of an electrical analogue which employs a conductive model, say a pool of electrolyte the shape of which is analogous to that of the petroleum producing structure undergoing investigation. Wells in the structure are represented by electrodes projecting into the pool. In the case of a gas condensate field being subjected to a cycling operation, some of the electrodes may represent injection wells and others extraction wells. Exploration of the potential gradients set up in the pool by the electrodes permits accurate mapping of the "invasion front" of the dry gas being pumped into the injection wells to displace wet gas removed through the extraction wells.

Similar analogies may be drawn between the flow of electricity and the conduction of heat in solid thermal conductors, the distribution of mechanical stresses in loaded structures, and the distribution of flux in electrical, magnetic and electromagnetic fields. The electrical model or analogue technique is applicable to solution of problems arising in all of the foregoing cases, examples being the design of hydraulic structures such as dams and the design of electrical apparatus including condensers, insulators, conductive terminals and electrical discharge devices such as vacuum tubes, radiation counters, electrostatic lenses, etc.

The electrical logging technique is employed in oil and gas fields to investigate the nature and thickness of the various earth formations penetrated by wells. Currents are set up in the mud or liquid in the well bore and thereby in the formations and the effects of these currents are measured with one or more exploring electrodes which are drawn through the bore, observed potentials being plotted against well depth. Both "self potential" and "resistivity" logs are obtained and yield valuable information with respect to subsurface geology.

The earth formations penetrated by a deep well usually consist of a multitude of layers of various thicknesses and resistances and with various self potentials. The interpretation of "self potential" and "resistivity" logs obtained in such wells has, thus far, depended upon a number of theoretical considerations which cannot be verified in actual wells because of the large number of unknowns involved. There is a distinct need for a technique whereby various theories and hypothesis employed in well log interpretation may be subjected to check. We have developed such a technique. It employs an electrical analogue or potentiometric model of a well bore and its surrounding earth formation or formations. We have also developed novel electrically-conducting barriers which are useful in the construction of electrical analogues of well bores and in various other types of electrical analogues and potentiometric models.

In our potentiometric model of a well bore, we provide an elongated trough or basin, preferably of wedge-shaped cross section with a bottom which slopes down toward one side. A longitudinal impervious barrier divides the trough into two adjacent compartments, one narrow (and preferably shallow) and the other wide (and preferably deep). Means is provided for transmitting electrical current across the barrier at a plurality of points throughout its length, but not longitudinally thereof. In other words, no equipotential surface is necessarily established at the barrier. Pools of electrolyte are disposed in the two compartments, with the narrow compartment representing the well bore and the wide compartment representing the earth penerated by the bore.

In order to simulate a series of earth formations penetrated by the bore, the wide compartment may be subdivided by partitions disposed transverse to the longitudinal barrier (which represents the wall of the well bore). Each of these partitions should be provided, like the longitudinal barrier, with means for conducting electricity across it substantially throughout its length, but not longitudinally.

Each of the several compartments contains a pool of electrolyte (say a water solution of copper sulphate) and the resistivity of each solution is adjusted to simulate the resistivity of the body it represents, say the mud of the bore or one of the formations or beds penetrated by the bore.

The so-called impervious electrically conducting barriers of the invention may take various forms. Perhaps the simplest is an upright wall of insulating material provided with U-shaped electrical conductors hung over the top of the wall slightly out of contact with each other and projecting into electrolyte pools on each side. Each conductor carries some current and does establish an equipotential line between the pools, but since the conductors are out of contact with each other they do not establish an equipotential surface, which would also be established if the barrier or wall was a conductor throughout. Other and preferred forms of the barrier of the invention are described hereinafter.

The well model of the invention is energized, for example, by means of electrodes disposed in the "bore" compartment, and a log is obtained by passing one or more exploring electrodes along the compartment which represents the bore, the observed potentials at the several points investigated being plotted against the compartment length, which represent well depth.

As indicated above, in the practice of our invention we investigate the behaviour of earth formation systems by studies of potentials set up in an electrical model which simulates the system. Thus the model can be employed to verify the computed resistivity departure curves which are used in correcting actual resistivity measurements obtained in well logging to so-called "true" resistivity.

These and other aspects of the invention will be understood more thoroughly in the light of the following detailed description, taken in conjunction with the accompanying drawings in which:

Fig. 1 is a perspective view, partly in section, of a model constructed in accordance with our invention to simulate a well which penetrates a number of earth formations;

Fig. 2 is a perspective view, partly in section of a conductive barrier of our invention for use in the model of Fig. 1;

Fig. 3 is an enlarged section of an alternate form of the conductive barrier of Fig. 2 for use in "self-potential studies";

Fig. 4 is an enlarged section through another type of conductive barrier of the invention;

Fig. 5 is a perspective view of still another type of conductive barrier of the invention;

Fig. 6 is a perspective view of a well model employing the conductive barrier of Fig. 5;

Fig. 7 is a perspective view of a further type of conductive barrier of the invention;

Fig. 8 is a schematic diagram, partly in plan, of an apparatus for mapping the invasion front of dry gas being injected into a wet gas producing structure in a cycling or re-pressurizing operation and illustrating a further application of the conductive barriers of the invention; and Fig. 9 is a partial section through the apparatus of Fig. 8 taken along the line 9—9 of that figure.

A model which looks the same way as a well with its surrounding formations is cumbersome to build and use. Moreover, such a complete model is unnecessary. All the phenomena which occur in a well bore are symmetrical with respect to the axis of the well. Because of this symmetry, a well with its surrounding formation can be represented by a wedge defined by two planes which contain the axis of the well and cross each other on that axis. Preferably the other wall of the wedge is a portion of a cylinder the axis of which is that of the well, but if the portion of the wedge representing the formations is very large with respect to the portion at the apex representing the well bore, this other wall may be flat. The wedge may be the quadrant of a cylinder having the "well axis" as its axis, or a smaller "slice" may be used.

To facilitate the use of liquids in the model, its axis (the well axis) is disposed horizontally instead of vertically, with the bottom of the wedge-shaped tank sloping downward away from the axis. The liquid in the tank thus assumes a wedge-shape, the bottom defining one side and the liquid level the other. Attention is directed to Fig. 1, which shows such a tank 10. It has a flat bottom 11 which slopes downward away from the "well axis" 12, a vertical side wall 13 which is fastened to the bottom and wedge-shaped end walls 14, 15 which help to retain pools of electrolyte 16, 17. A vertical barrier 18 parallel to the side wall separates a part of the slice near the well axis from the rest of the slice. Thus the pool 16 near the axis represents the well, while the larger and deeper pool 17 represents the formations penetrated by the well. In the case illustrated there are three such formations, 17A, 17B, 17C. These are separated from each other by vertical wedge-shaped partitions 19, 20, which are parallel to the end walls. The liquid levels of the inner pool 16 representing the well bore, and the outer pools 17A, 17B, 17C representing the formations are the same and pass through the well axis.

As already indicated, the side wall 13 and the barrier 18 (which represents the wall of the well) may be curved about the well axis, if desired.

The barrier 18 and the partitions 19, 20, must have electrical properties appropriate to the particular problem being studied. In other words, means must be provided for conducting electricity through or over these barriers at a plurality of points along them, but the barriers should not be conductive longitudinally. The pool 16, representing the well bore, and the pools 17A, 17B, 17C representing the three formations penetrated by the well are made up of solutions of electrolytes having electrical values appropriate to the problem. The electrical characteristics of barriers and pools are discussed in greater detail hereinafter.

To simulate a resistivity log with the model of Fig. 1, current electrodes 21, 22, with exploring electrodes 23, 24 are moved in fixed spaced relationship along the pool 18 (representing the mud or liquid in the well bore). Current is applied through the current electrodes, and thus there is a distribution of current through all of the pools in the model, including the pool 18. The resulting potentials set up between the exploring electrodes are measured at a plurality of points along the pool 18 as in actual logging practice and plotted against the pool length, which represents depth in the well bore. The distance between partitions represents, of course, formation thickness.

Any other electrical logging apparatus, and a variety of conventional logging electrode arrangements can be used for logging the model.

In some cases, the drilling fluid in a well may penetrate into surrounding rock formation and alter its electrical characteristics. It is possible to simulate this condition in the model of Fig. 1 by introducing an additional barrier in one or more of the compartments 17A, 17B, 17C representing the formations. Thus a barrier 100 may be introduced into the compartment 17A parallel to the barrier 18 representing the side of the well bore so as to make a sub-compartment 101. The barrier 100, like the barrier 18, should be conductive transversely but not longitudinally, and the electrolyte pool in the sub-compartment 101 should have a conductivity analogous to that of the part of the formation penetrated by the drilling fluid.

Theoretically, the width 25 and the length 26 of the model should be infinite, to simulate the substantially infinite dimensions of the formations which surround the well. As a practical matter, this is not necessary, but the width of the pools representing the formations should be great compared to that of the pool representing the well bore, and as a further refinement, the effect of the limited dimensions of the model may be overcome as described and claimed in co-pending application Serial No. 98,268, filed June 10, 1949, by Burton D. Lee and Gerhard Herzog.

The resistivity curve of an electrical well log depends on the resistivities and the thicknesses of neighboring formations and on the arrangement of the electrodes in the logging tool. For the quantitative interpretation of the resistivity curve it is necessary to know the influence of these various factors on the measured apparent resistivity. Theoretically it is possible to calculate the apparent resistivity for any combination of formations or beds and electrode spacing. Practically, however, these calculations become very involved and they have been carried out only for simplified assumptions. See the two papers published by S. J. Person in the "Oil and Gas Journal," vol. 46, 1947, and a paper by H. Guyod in "World Oil," vol. 127, page 231, 1947.

Potentiometric model studies conducted in accordance with the instant invention permit the solution of the complex cases encountered in actual field practice. The model employed has sections representing the well and all formations penetrated. That representing the well bore is filled with a liquid of a resistivity which corresponds to the resistivity of the mud in the bore. The sections representing the various formations are filled respectively with liquids having resistivities corresponding to the resistivities of the formations. Conveniently, the several sections are filled with aqueous solutions of electrolytes, the required resistivity in each case being determined by the concentration of the electrolyte, say a soluble salt of a strong mineral acid, e. g., copper sulphate or sodium nitrate.

Electrical connection must be maintained along the barriers which separate the several pools or sections. But a barrier of solid conductor, say a metal sheet, creates an equipotential surface at the barrier, whereas no such equipotential surface need occur at the interface between adjacent earth formation or at the wall of the well bore. In short, the barrier should be so constructed that it conducts electricity in one direction only, i. e. transverse to the barrier, or at most in two directions, i. e. transverse and laterally, but not longitudinally.

In model studies in which it can be assumed that potentials vary in two directions but not in the third, a satisfactory barrier for the practice of the invention is that illustrated in Fig. 7, which shows a barrier 30 of insulating material over which is hung a series of U-shaped conductors 31, say small copper wires. The conductors are hung close to, but separated from each other and drop into the pools of electrolyte (not shown) on both sides of the barrier. Each wire conducts some current across the barrier and does establish an equipotential line, but not an equipotential surface. In other words, the U-shaped conductors are means for conducting current across the barrier and up and down the barrier but not along it.

In some cases, it is desirable that the conduction be only across the barrier. In accordance with the invention this is accomplished by providing a barrier of non-conducting material having embedded in it a plurality of small conductors spaced from each other and running transversely. If the cross section of the individual conductors is small and the spacing close, there is an approximation of continuous conductivity over the major surface of the barrier, but without establishing either an equipotential plane or an equipotential line, each individual conductor transferring the current which normally would flow across the interface without interfering with the effect of adjacent wires.

Fig. 2 illustrates one form of the barrier just described. It comprises a plastic sheet 40, having embedded in it a multitude of fine wires 41 which are spaced closely over the entire surface of the sheet and pass transversely through it. This barrier is conveniently made as follows:

Take a number of strips of plastic of insulating quality, each strip being as long as the barrier required and about an inch or an inch and a half thick. Run fine bare copper wire over a knurling tool to give it a rough surface into which plastic cement can flow. Wind the wire in a spiral around each strip transverse to its length with each turn slightly separated from adjacent turns. Give each wound strip a heavy coat of plastic cement corresponding in composition to the strips. Make a sandwich of the wound coated strips with unwound strips of like character interposed between them. Clamp the sandwiched strips together until the cement has set hard. Saw a slice off each side of the sandwich so that the spirals are destroyed, leaving a sheet, about an inch thick with the wires running through it. Saw this sheet normal to the wires into slices about a sixteenth inch thick.

The barrier of Fig. 2 can be produced in other ways, for example, by flowing liquid plastic around a grid of wires strung parallel to each other from supports and allowing the plastic to set or by setting the wires in a jig having holes for the individual wires and upper and lower plates between which liquid plastic is poured and allowed to set.

Fig. 4 illustrates another type of conductive barrier useful for the practice of the invention. It is made up of small copper spheres 45 insulated from each other and embedded in a sheet of plastic 46. Such a structure is conveniently made by coating the individual spheres with an insulating layer, say varnish or enamel. The spheres are then packed as a single layer on a tray and joined together by pouring a liquid plastic insulator over the layer so as to fill the interstices between coated spheres. After the plastic has set, top and bottom are sanded off to expose opposite portions of the spheres, as shown in Fig. 4. It is desirable to subject the spheres to a knurling or roughening operation before coating in order to improve the bond between conductor and insulator.

The spheres are coated in the foregoing operation to prevent metal-to-metal contact and still permit the spheres to be closely packed. The same result can be obtained by placing the uncoated spheres in a tray having bottom indentations which hold the spheres close together but out of contact, a layer of plastic being cast into the intervening spaces with the spheres thus held in place.

The "self potential" curve of an electrical well log is affected by various factors, not all of which are as yet clearly understood. However, it is generally accepted that the "self potential" is caused by voltage differences which exist at the boundaries or interfaces between adjoining formations and between the formations and the fluid in the well. These voltages in turn depend on the materials which compose the formation and on the fluids contained in the well and in the formations, as well as upon pressure differences between the fluid in the well and those in the formations. For practical purposes, the aforementioned factors may be grouped into a series of potential differences distributed along the boundaries (a) between formations and (b) between the formations and the well.

These differences can be represented in a well model by employing barriers which set up voltages between adjacent pools, although in addition the resistivity of the several pools has to be adjusted as explained previously. One way to set up the potential difference across the barrier is illustrated in Fig. 3, which shows a barrier identical to that of Fig. 2, except that the several wires are built of two different conductors. Thus each wire is composed of a right half 51 of iron welded to a left half 52 of copper so that a contact voltage is produced at the junction, the junctions being embedded in the insulator 53 out of which the barrier is built. In effect, the barrier is a wall with a large number of built-in batteries or electrolytic piles. By selecting different metal couples, different voltage differences can be set up through the barrier or through different barriers.

The structure of Fig. 4 can be modified as described above to obtain the same result as with the structure of Fig. 3. In such case, the sphere halves on one side of the barrier are composed of a different metal than those on the other side, adjacent sphere halves being welded together. Similarly, the type of structure illustrated by Fig. 7 in which the conductors are wire U's or the structure of Fig. 5 in which the conductors are conductive lines drawn on a wall, may be modified to convert the conductors into electrolytic piles. In either case, one side of the U is formed of one metal and the other side of a different metal, with the junctions disposed at the top of the wall.

In certain classes of potentiometric models or analogues, forms of symmetry exist from which one can deduce the general shape of equipotential surfaces. In such case the use of a continuous metallic conductor which conforms to the shape of these equipotential surfaces will still permit proper potential distribution in the model. One such case has already been described with reference to Fig. 7 in which the U-shaped wires lie respectively in equipotential surfaces. But in any case in which the form of the equipotential surfaces is known, this form will define the trace of the equipotential surface at its intersection with the barrier. In such case, a family of closely spaced curves may be drawn on the non-conducting barrier surfaces (both sides) using a suitable conductive ink, say one of colloidal silver base such as now used in "printed circuit" work. The lines on opposite surfaces are connected by continuing them over one edge of the barrier until they meet. If desired, the conductivity of the lines thus formed may be increased by electroplating, say with copper.

Figs. 5 and 6 illustrate the case just described. In the potentiometric model 60 of Fig. 6, two oppositely charged point electrodes 61, 62 represent such a pair of electrodes disposed in an infinite homogeneous medium. The line 63 joining these two points is an axis of symmetry. All equipotential surfaces resulting from these charges are surfaces of revolution whose centers lie on this axis, and any plane drawn normal to this axis will intersect equipotential surfaces whose traces will be circles in the plane with centers on the axis. Any radial line drawn in the plane from the axis is also a line of symmetry so that investigations of the system may be made in a model having the wedge-shaped tank 64 illustrated in Fig. 6 with the central electrodes placed at the apex of the wedge, as shown and with a barrier 65 placed normal to the line joining the electrodes and constructed as shown in Fig. 5, equipotential lines being represented by the family of closely spaced circular conductive stripes 66 drawn on opposite sides of the insulating barrier with silver ink or the like and joined at the top of the barrier.

Since the well model of Fig. 1 also represents a symmetrical system in which equipotential surfaces are surfaces of revolution that make circular traces on the wedge-shaped partitions, a barrier of the type illustrated in Fig. 5 can be used to replace the partitions which represent boundaries between formations.

The barriers of the invention may be employed in potentiometric models other than those which simulate wells in the earth. For example, they are applicable in models simulating magnetic circuits in which magnetic permeability varies or in models simulating condenser designs in which dielectric constant varies and must be represented. The use of the barriers is most successful in cases where there is a sharp change of the characteristic, say dielectric constant, to be represented.

Figs. 8 and 9 illustrate the application of the barriers of the invention in a potentiometric model of a natural gas field being subjected to re-cycling. Save for the barrier, the apparatus of Figs. 8 and 9 is the same as one described in co-pending application Serial No. 791,797, filed December 15, 1947, by Alexander Wolf. It comprises an electrolytic model 70—in the form of a basin 71 of insulating material shaped to correspond to a wet gas field being investigated and containing an electrolyte pool. Electrodes 72, 73, 74 correspond to extraction wells from which wet gas is taken. An electrode 75, corresponds to an injection well through which dry gas is returned to the field structure. All of the electrodes project into the pool from the bottom and receive current from a source 76 connected between them. The extraction electrodes are in parallel.

A vertical conductive probe 77 is supported above the pool in contact therewith and is mounted on one end of a longitudinal slider 78. The other end of the slider carries a vertical marker 81. A chart 81 corresponding to the model in plan and orientation is disposed below the marker.

The longitudinal slider 78 is slidable longitudinally in a lateral slider 79—which is slidable along a horizontal supporting rail 57—running at right angles to the longitudinal slider. Since both longitudinal and lateral motions are obtainable, the probe may be moved to any portion of the model with the marker occupying a corresponding position above the chart.

Means is provided for determining the potential found by the probe at any point on the model. Thus a potentiometer 83 consisting of two adjustable resistances 83A, 83B in series is connected between the injection electrode and one of the extraction electrodes. The probe is connected to the common point of the potentiometer through a galvanometer 84.

Adjustment of potentials at the extraction electrodes to simulate any desired set of extraction rates at the corresponding wells may be accomplished by means of variable resistances 85, 86, 87 connected respectively to the extraction electrodes 72, 73, 74.

In the gas field represented by the apparatus of Fig. 8, there are two regions having different permeabilities. The rate of travel of gas through the field is, of course, affected by these permeabilities and they should be taken into account in the model study. Conductivity in the model is analogous to permeability in the field, which is to say that resistivities of the electrolyte in the pools of the model should be inversely proportional to the permeabilities.

The basin of the model is divided by an upright conductive barrier 89 (which may be of any of the types previously described, say that of Fig. 7) into two compartments corresponding to the two fields regions having different permeabilities. The resistivities of the electrolyte pools contained in the respective compartments are adjusted to simulate the respective permeabilities of the two field regions.

In a cycling project in a gas-condensate field, represented by the model of Figs. 8 and 9, "wet" gas is produced from the extraction wells and sent to a processing plant where liquid condensate is removed. The remaining "dry" gas is injected back into the producing formation through one or more injection wells, both to conserve the gas for future use and to maintain pressure in the field. In such a cycling operation, the manner in which the dry gas spreads through the field should be known, because the ultimate recovery of wet gas and of the valuable liquid products it contains depends largely on keeping the dry gas from breaking into the extraction wells for as long as possible. It is thus necessary to know the shape of the "invasion front" of the injected dry gas in the formation. This can be determined with the model of Figs. 8 and 9 for various assumed injection and extraction rates and well positions, to the end that a scheme of field exploitation may be selected which will postpone dry gas break-through to the latest possible date for a given rate of extraction.

Through the electrodes of the model, electric currents are passed into or out of the pool, the flow of current being into the pool at the injection electrode and out of the pool at extraction electrodes and the magnitude of the currents being proportional to the fluid injection and extraction rates which it is proposed to employ in the exploitation of the field. The direction of current flow at any point in the conducting pool is then identical to the direction of fluid flow in the field structure represented, and the potential gradient at any point in the pool is proportional to the pressure gradient in the structure at a corresponding point. Any element of fluid in the structure follows a path corresponding to a current flow line in the pool and the transit time for such element of fluid from one point to another in the formation is proportional to the line integral $$\int \frac{\delta x}{\delta p} dx$$

taken along a flow line in the structure, where $x$ is the travel distance and $p$ is the pressure. Hence the transit time for any element of fluid in the structure is also proportional to the line integral $$\int \frac{\delta x}{\delta v} dx$$

taken along a current line in the conducting pool, where $x$ is the corresponding travel distance in the pool and $v$ is the potential. As already indicated, the conductivities of the two portions of the pool representing the regions of different permeability in the structure are made to correspond to the respective permeabilities.

In the operation of the apparatus of Figs. 8 and 9, equipotential lines set up in the model by the chosen conditions of operation are first plotted. The sum of the resistances which compose the potentiometer is kept constant, but by adjusting the ratio of the two resistances the potential at their common point is set at a desired percentage of the total voltage across the two resistances. The pool of electrolyte is then explored with the probe to locate the equipotential line corresponding to this voltage. When the probe occupies a point on this line, the galvanometer will read a minimum value. Each time a point on the equipotential line is found, a corresponding point on the chart is marked, this being possible because the marker moves over the chart in the same way that the probe moves over the model. When one equipotential line has been plotted, the resistances are shifted to a different setting, and the operation is repeated to locate a second equipotential line, and so on. Flow lines are then constructed on the chart perpendicular to the equipotential lines. Transit times along the several flow lines are then computed as described above, and points of equal transit time are connected together to establish the dry gas "invasion fronts." These show the extent of invasion of the dry gas for the assumed set of conditions at the end of any particular time selected. By readjusting the potential flow between injection and extraction electrodes a number of times to simulate a corresponding set of assumed injection and extraction rates for the actual wells, and plotting invasion fronts each time, the effect of various exploitation procedures may be determined in advance and that plan when chosen will give optimum recovery. In short, any number of proposed exploitation procedures for a wet gas field may be investigated prior to actual exploitation to determine which one of the procedures is best.

The use of the barriers of the invention has been described with respect to potentiometric models simulating a well passing through different strata and also with respect to a potentiometric model of a wet gas field being subjected to a re-pressurizing operation with recovered dry gas. It should be understood however, that there are numerous other applications of the barriers in potentiometric models, for example, to represent the boundary between materials of different magnetic permeabilities in a magnetic circuit to represent the boundary between two materials of different dielectric character in a composite insulator, and to represent the boundary between two materials having different thermal conductivities in a model of a heat transfer system.

We claim:

1. In a potentiometric model of a well, the combination which comprises an elongated trough provided with a longitudinal impervious barrier which divides the trough into two longitudionally extending compartments, means for transmitting electrical current across the barrier at a plurality of points along its length and transverse thereto but not longitudinally, said means including pools of electrolyte respectively disposed in the compartments.

2. In a potentiometric model of a well, the combination which comprises an elongated trough of substantially uniform wedge-shaped cross section provided with a longitudinal impervious barrier which divides the trough into two longitudinally extending compartments, one wide and deep and one narrow and shallow, means for transmitting electrical current across the barrier at a plurality of points along its length and transverse thereto but not longitudinally, said means including pools of electrolyte respectively disposed in the compartments.

3. In a potentiometric model of a well, the combination which comprises an elongated trough provided with a longitudinal impervious barrier which divides the trough into two longitudinally extending compartments, at least one additional impervious barrier disposed transverse to the first and subdividing the wide compartment into a plurality of compartments each shorter than the narrow compartment, means for transmitting electrical current across the barriers at a plurality of points along their lengths but incapable of conducting current lengthwise of the barriers, said means including pools of electrolyte respectively disposed in the compartments.

4. In a potentiometric model of a well, the combination which comprises an elongated trough of wedge-shaped cross section provided with a longitudinal impervious barrier which divides the trough into two longitudinally extending compartments, at least one additional impervious barrier disposed transverse to the first and subdividing one compartment into a plurality of compartments, means for transmitting electrical current across the barriers at a plurality of points along them but incapable of transmitting current lengthwise of the barriers, said means including pools of electrolyte respectively disposed in the compartments.

5. Apparatus according to claim 4 in which the resistivity of the pool in the unsubdivided compartment is proportional to the resistivity of the fluid in the bore of the well represented by the model and the resistivities of the other pools are proportional respectively to the resistivities of the corresponding formations penetrated by the well.

6. Apparatus according to claim 4 provided with means for setting up a potential across at least one of the barriers.

7. Apparatus according to claim 4 provided with means for setting up a potential across at least one of the barriers, said means comprising a plurality of bimetallic piles sealed in the barrier with one metal of the pile in contact with the electrolyte on one side of the barrier and the other metal of the pile in contact with the electrolyte on the other side of the barrier.

BURTON D. LEE.
GERHARD HERZOG.

REFERENCES CITED

The following references are of record in the file of this patent:

UNITED STATES PATENTS

| Number | Name | Date |
|---|---|---|
| 1,631,568 | Yngve | June 7, 1927 |
| 2,423,754 | Bruce | July 8, 1947 |
| 2,428,470 | Powers | Oct. 7, 1947 |
| 2,472,464 | Bruce | June 7, 1949 |